No. 745,443.                                                             Patented December 1, 1903.

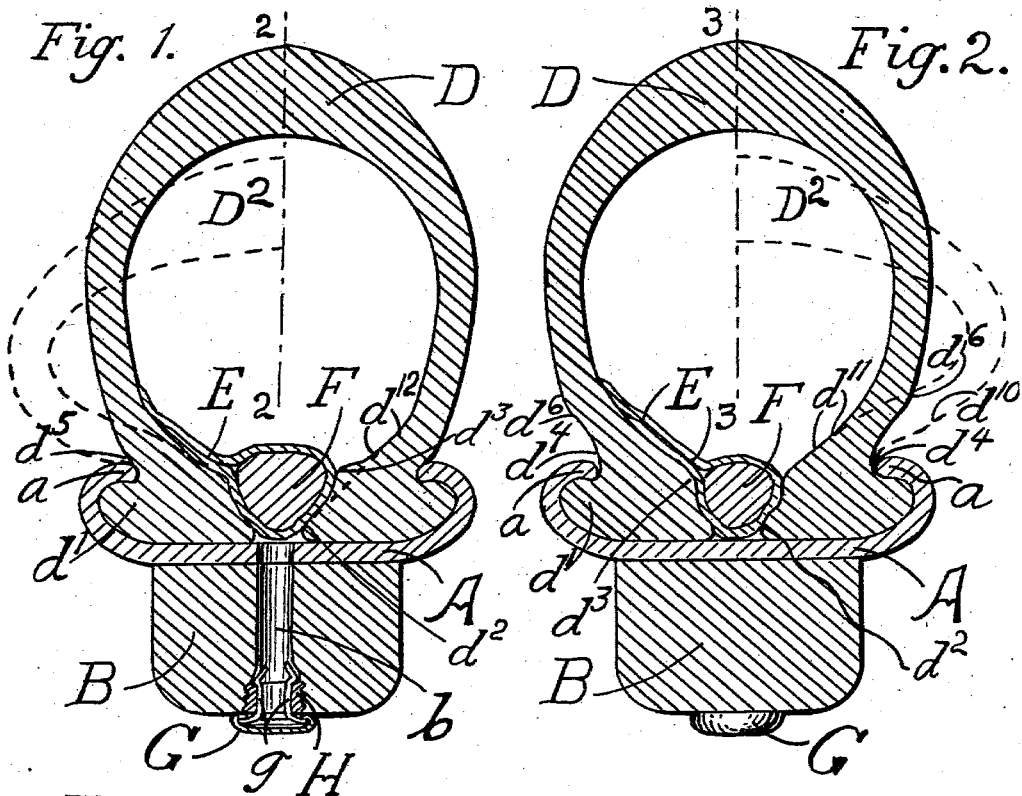

UNITED STATES PATENT OFFICE.

HERBERT ELLWOOD IRWIN, OF GALESBURG, ILLINOIS, ASSIGNOR TO IRWIN RUBBER COMPANY, OF CHICAGO, ILLINOIS, A CORPORATION OF ILLINOIS.

DETACHABLE TIRE.

SPECIFICATION forming part of Letters Patent No. 745,443, dated December 1, 1903.

Application filed May 13, 1903. Serial No. 156,985. (No model.)

*To all whom it may concern:*

Be it known that I, HERBERT ELLWOOD IRWIN, a citizen of the United States, residing at Galesburg, in the county of Knox and State of Illinois, have invented certain new and useful Improvements in Detachable Tires, of which the following is a specification.

This invention relates to improvements in that class of double-tube pneumatic tires that are readily detachable from the wheel-rim, and has for its primary object to combine a simple and positive tire engagement in such a tire and to have it capable of use upon the wheels of automobiles as well as upon vehicles in general, also upon the bicycle and the like.

Another object of my invention is to attach a ring, hinge-like, to one of the inside walls of the outer casing, so that in its normal position it lies between the opposed edges or flanges of the casing and prevents the beads from being withdrawn from under the overhanging edges of the rim.

A further object of this invention is to place a hinged ring between the opposing flanges at the base of the tire to furnish a good seat for the air-tube and also to prevent it from being pinched between the edges of the casing.

Another object of the invention is to provide means for raising the locking-ring from between the flanges of the casing to permit the disengagement of the tire from the rim.

Still a further object of my invention is to construct a tire that will not rim-cut.

These and other objects as may hereinafter appear are attained by the devices illustrated in the accompanying drawings, in which—

Figures 1 and 2 are transverse sections of the clencher type of tire equipped with a hinged ring. Fig. 3 is a transverse sectional view of a tire mounted on a channeled wood rim with the inner air-tube inflated. Figs. 4 and 5 show sectional views of portions of tire-bodies equipped with ring-covers, but without the rings being inserted in them.

Similar letters of reference indicate the same parts in the several figures of the drawings.

Referring by letter to the accompanying drawings, A indicates a steel wheel-rim mounted upon a wood felly B, the said rim being provided with overhanging or hooked edges $a$, under which beads $d'$ on the flanges of the outer casing D fit.

C indicates a wood wheel-rim having a channel in the periphery thereof, the lower portion of which being denoted by $c^2$ and the undercut sides by $c'$, into which beads $d^8$ on the flanges of the casing D', which abut at $d^9$, fit. The casing D' is rifted at its inner circumference and incloses an air-tube J.

The so-called "clencher-tires" frequently become disengaged from the rim, and to provide against such occurrences I construct a locking-ring F, which normally lies in a channel or trough between surfaces $d^2$ and $d^3$ on the flanges of the casing. Ring F is hinged by ring-cover E to the inner surface of the casing, and when the parts are assembled the air-pressure will force the ring tightly between the opposing surfaces of the flanges of the casing, thereby causing the beads on the flanges to occupy the space under the overhanging edges of the rim and which cannot be disengaged from the rim until said ring is removed from its position, thereby permitting the flanges to approach each other and the beads to be withdrawn from under the overhanging edges of the rim. Hinge-ring F may also be applied to that type of tire which depends more particularly upon the insertion of wire tape in the tire-body for its engagement with the rim.

It is customary with certain types of tires at the present time to subject them to high air-pressure, so that they may be more positively held to the rim; but, on the other hand, the resiliency of the tires is reduced in direct proportion as the tires become hardened by air-pressure. By my present invention it will be observed that a low air-pressure is entirely sufficient to maintain the tire in engagement with the rim, and such a tire, therefore, affords a very large degree of resiliency without danger of becoming disengaged from the rim.

To facilitate the dislodgment of ring F, I make use of a tool which operates through hole $b$ in felly B and rim A. In order to prevent foreign matter from entering the tire, I inclose opening $b$ with cap G, which is equipped with spring-tongues $g$, the hooked parts of which snap over the shoulder of sleeve H, which preferably screws into the wood felly B. The spring-tongues hold the cap tightly in place and at the same time can be easily removed. It is evident that a tool passing through hole $b$ will dislodge ring F and permit a ready detachment of the tire. In Fig. 3 no tool is required to dislodge the ring, since when the tire is deflated and the walls compressed toward each other ring F will rise in the trough-shaped space and permit the detachment of the tire.

Ring F is composed of a small rope or fabric cord and may be inserted in its cover E before or after the tire has been cured. Ring-cover E is shown in Figs. 4 and 5 without ring F being inserted in it, and the heavy lines $e$ indicate surfaces that have been treated to prevent them from adhering together when the tire is being vulcanized or cured.

I am aware that detachable tires have been constructed with a flap formed of several layers of fabric vulcanized together, forming a flap of uniform thickness which is cemented to the inside of the tire-cover. My hinged ring is entirely different from such a flap, since it is composed of two elements—a ring-cover and a fabric ring. The ring-cover E consists of a single layer of cloth fabric, and its sole function is to secure a fabric ring hinge-like to the inner side of a tire-cover. Ring F consists of woven or braided fabric, like a rope, substantially round in cross-section. Hinge-ring F and ring-cover E are an improvement upon the ring and ring-cover disclosed in a patent granted to me August 4, 1903, No. 735,265, wherein the air-tube was provided with a fabric strip that in turn secured a ring or band, thus forming a rib on the base of the air-tube. My present ring instead of forming a part of the air-tube, as in the former patent, becomes a part of the tire-cover.

Clencher-tires are known to give out at an annular line $d^5$, which is termed as "rim-cutting," the same being caused by the bending and bearing down of the tire around the sharp edge $a$ of the rim. In Fig. 1 the side walls of the casing are shown rising abruptly at $d^5$ and in the dotted position $D^2$ are shown resting tightly on top of the rim at $a$. Corresponding to $d^5$ in Fig. 1 is $d^4$ to $d^6$ in Fig. 2, the latter showing a depression toward the center of the tire or forming a concave surface between $d^4$ and $d^6$. In dotted position $D^2$ the point $d^6$ has taken the position $d^{10}$, and, as shown, the surface $d^4$ to $d^{10}$ does not rest on top of the rim at $a$. The annular surface between $d^4$ and $d^5$ may be known as "depressed" or "concave." The present clencher-tire as now put on the market is very similar to that shown in Fig. 1, with the inner surface of the casing at $d^{12}$ running straight, as shown by broken line, to $d^2$. In order to avoid the abrupt convex surface at $d^3$, I add to the inner surface of the casing at $d^{12}$ as shown at $d^{11}$. It will be readily seen that a tire under load, as shown in Fig. 2, rests entirely upon the base of the rim, where the load should be carried, and the liability to rim-cut is reduced to a minimum.

Changes in the form of the hinge-ring, as well as in the form of the flanges with which the ring comes in contact, may be made without departing from the spirit of my invention, and all such changes are contemplated by the following claims.

Having thus described my invention, what I claim, and desire to secure by Letters Patent, is—

1. The combination with a channeled wheel-rim provided with overhanging sides, of a tire-casing open on its inner side and having annular flanges adjacent to said opening, said flanges having on their outside beads adapted to lie under the overhanging sides of the rim and having on their inside opposite said beads surfaces forming a substantially semicircular space, said space being occupied by a fabric ring-cover having a fabric ring inserted therein substantially round in cross-section, the said ring-cover being secured hinge-like to the inner side of the tire-casing, so that when the parts are assembled and the air-tube inflated the said hinged ring prevents the beads on the flanges from being withdrawn from under the overhanging sides of the rim, substantially as described.

2. The combination with a channeled wheel-rim provided with overhanging sides, of a tire-casing rifted on its inner side and having annular flanges adjacent to said rift, said flanges having on their outside beads adapted to lie under the overhanging sides of the rim and having on their inside opposite said beads surfaces forming a substantially V or trough shaped space, said space being occupied by a fabric ring-cover having a fabric ring inserted therein substantially round in cross-section, the said ring-cover being secured hinge-like to the inner side of the tire-casing, so that when the parts are assembled and the air-tube inflated the said hinged ring prevents the beads on the flanges from being withdrawn from under the overhanging sides of the rim, substantially as described.

3. The combination with a channeled wheel-rim, of a tire-casing rifted on its inner side and having annular flanges adjacent to said rift, and a fabric ring-cover having a fabric ring inserted therein substantially round in cross-section adapted to lie between the inner surfaces of the flanges, said ring-cover being fastened hinge-like to the inner side of the tire-casing, substantially as described.

4. The combination with a channeled wheel-rim provided with overhanging sides, of a tire-casing open on its inner side and having annular flanges adjacent to said opening, said flanges having on their outside beads adapted to lie under the overhanging sides of the rim, and a fabric ring-cover having a fabric ring inserted therein arranged to lie between the inner surfaces of the flanges, said ring-cover being secured hinge-like to the inner side of the tire-casing, substantially as described.

5. The combination with a wheel-rim provided with overhanging sides, of a tire-casing open on its inner side and having annular flanges adjacent to said opening, said flanges having on their outside beads adapted to lie under the overhanging sides of the rim, and a fabric ring-cover having a broken fabric ring inserted therein arranged to lie between the inner surfaces of the flanges to lock the tire to the rim, said ring-cover being secured hinge-like to the inner side of the tire-casing, substantially as described.

6. The combination with a channeled wheel-rim provided with overhanging sides, of a tire-casing split on its inner side and having annular flanges adjacent to said split, said flanges having on their outside beads adapted to lie under the overhanging sides of the rim, a hinged ring lying between the inner surfaces of said flanges and under the air-tube, and a plurality of holes passing through the rim and underneath the said ring whereby a tool may operate through said holes to raise the ring from its seat thereby unlocking the tire from engagement with the rim, substantially as described.

7. The combination with a wheel-rim provided with overhanging sides, of a tire-casing split on its inner side and having annular flanges adjacent to said split, said flanges having on their outside beads adapted to lie under the overhanging sides of the rim, a hinged ring lying between the inner surfaces of said flanges and under the air-tube, and a plurality of holes passing through the rim and through the wood felly on which said rim is mounted, the said holes being inclosed with removable caps, substantially as and for the purpose described.

8. The combination with a wheel-rim provided with overhanging edges, of a tire-casing open on its inner side and having annular flanges adjacent to said opening, said flanges having on their outside beads adapted to lie under the overhanging edges of the rim, and annular outer surfaces located above and adjacent to the edges of said rim, the said surfaces being depressed or concave in form so that when the tire is inflated and under ordinary load said concave surfaces do not rest on top of the edges of said rim, substantially as described.

9. The combination with a wheel-rim provided with overhanging edges, of a tire-casing open at its inner side and having annular flanges adjacent to said opening, said flanges having on their outside beads adapted to lie under the overhanging edges of the rim, a hinged ring occupying the space between the inner surfaces of said flanges, and depressed or concave outer annular surfaces located above the edges of the rim so that the load is carried on the base of the rim and not on top of the said rim edges, substantially as described.

In testimony whereof I have signed my name to this specification in the presence of two subscribing witnesses.

HERBERT ELLWOOD IRWIN.

Witnesses:
FRED L. CARLIN,
DAVID R. JAMES.